US009916566B2

(12) United States Patent
Barnes

(10) Patent No.: US 9,916,566 B2
(45) Date of Patent: Mar. 13, 2018

(54) MOBILE WIRELESS ORDER POINT AND PICK-UP STATION

(71) Applicant: Uni-Structures, Inc., Kennesaw, GA (US)

(72) Inventor: Michael S. Barnes, Marietta, GA (US)

(*) Notice: Subject to any disclaimer, the term of this patent is extended or adjusted under 35 U.S.C. 154(b) by 0 days.

(21) Appl. No.: 15/203,635

(22) Filed: Jul. 6, 2016

(65) Prior Publication Data

US 2018/0012209 A1 Jan. 11, 2018

(51) Int. Cl.
*H05K 7/00* (2006.01)
*G06Q 20/18* (2012.01)
*H05K 5/02* (2006.01)
*H05K 7/20* (2006.01)
*H05K 5/00* (2006.01)
*H05K 7/16* (2006.01)

(52) U.S. Cl.
CPC .......... *G06Q 20/18* (2013.01); *H05K 5/0017* (2013.01); *H05K 5/0234* (2013.01); *H05K 5/0239* (2013.01); *H05K 7/16* (2013.01); *H05K 7/20009* (2013.01); *H05K 7/20954* (2013.01)

(58) Field of Classification Search
CPC .... H05K 5/0017; H05K 7/16; H05K 7/20009; G06F 17/60; G06Q 20/18
USPC ............. 361/688; 705/26; 364/401; 235/382
See application file for complete search history.

(56) References Cited

U.S. PATENT DOCUMENTS

| 4,510,381 | A  | * | 4/1985 | Fukatsu | G07D 11/0003 109/24.1 |
| 2007/0118437 | A1 | * | 5/2007 | Perrault | G06Q 30/0641 705/27.1 |
| 2015/0062878 | A1 | * | 3/2015 | Danson | G09F 13/04 362/145 |
| 2017/0074453 | A1 | * | 3/2017 | Bowers | G06F 1/16 |

FOREIGN PATENT DOCUMENTS

GB          2436435 A  *  9/2007  ............ B60P 3/0257

* cited by examiner

*Primary Examiner* — Dion R Ferguson
*Assistant Examiner* — Mandeep S Buttar
(74) *Attorney, Agent, or Firm* — Michael F. Krieger; Kirton McConkie

(57) ABSTRACT

An apparatus can be employed as a mobile wireless order point and pick-up station. The apparatus can be configured to house a display device and to allow the display device to be used in many different locations for the purpose of receiving and/or picking up orders. To facilitate its mobility, the apparatus can include an integrated pallet jack and be configured with wireless communication capabilities and a portable power source. The apparatus may also include a retractable awning which can serve to provide shading to the display device to facilitate its use and to reduce heating when the apparatus is used in an outdoor environment.

19 Claims, 13 Drawing Sheets

MOBILE WIRELESS ORDER POINT AND PICK-UP STATION

CROSS-REFERENCE TO RELATED APPLICATIONS

N/A

BACKGROUND

Many businesses, such as restaurants, sporting venues, amusement parks, etc., employ digital display devices to convey inthrmation to their customers. These digital display devices (hereinafter "display devices"), which are similar to flat panel televisions, allow businesses to dynamically display and update content in a simple manner.

It is oftentimes desirable to enclose the display devices in order to protect them from environmental conditions or other damage. When the display devices are enclosed, it is typically necessary to provide some type of cooling system to ensure that the display devices do not overheat. This is especially true when the display devices are installed in outdoor environments where air temperature cannot be controlled.

Prior art display enclosure designs oftentimes employ a refrigerated (or active) cooling system to prevent overheating of the display devices. Although such active cooling systems are effective, they add complexity and cost to both the manufacturing and maintenance of the enclosure. Additionally, prior art display enclosures typically employ a stationary design thereby limiting where they can be used.

BRIEF SUMMARY

The present invention extends to an apparatus that can be employed as a mobile wireless order point and pick-up station. The apparatus can be configured to house a display device and to allow the display device to be used in many different locations for the purpose of receiving and/or picking up orders. To facilitate its mobility, the apparatus can include an integrated pallet jack and be configured with wireless communication capabilities and a portable power source. The apparatus may also include a retractable awning which can serve to provide shading to the display device to facilitate its use and to reduce heating when the apparatus is used in an outdoor environment.

In one embodiment, the present invention is implemented as a mobile wireless order point and pick-up station that includes: a frame comprising a first set of opposing vertical beams; a base coupled to the first set of opposing vertical beams, the base forming a cabinet for housing a battery and wireless circuitry; an enclosure for a digital display device, the enclosure being secured to the frame above the base; an awning coupled to the frame and positioned overtop the enclosure; and a pallet jack positioned under the base.

In another embodiment, the present invention is implemented as a mobile wireless order point and pick-up station that includes: a frame; a base coupled to the frame, the base housing a battery and wireless circuitry; an enclosure for a digital display device, the enclosure being positioned above the base and being secured to one or both of the frame or the base; and an awning coupled to the frame via a hinged connection, the awning having an extended orientation in which the awning is oriented generally horizotally overtop the enclosure and a retraced orientation in which the awning is oriented generally vertically in front of the enclosure.

In another embodiment, the present invention is implemented as a mobile wireless order point and pick-up station that includes: a frame; a base coupled to the frame; an enclosure for a digital display device, the enclosure being positioned above the base and being secured to one or both of the frame or the base; an awning coupled to the frame via a hinged connection; and a pallet jack integrated into the base.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
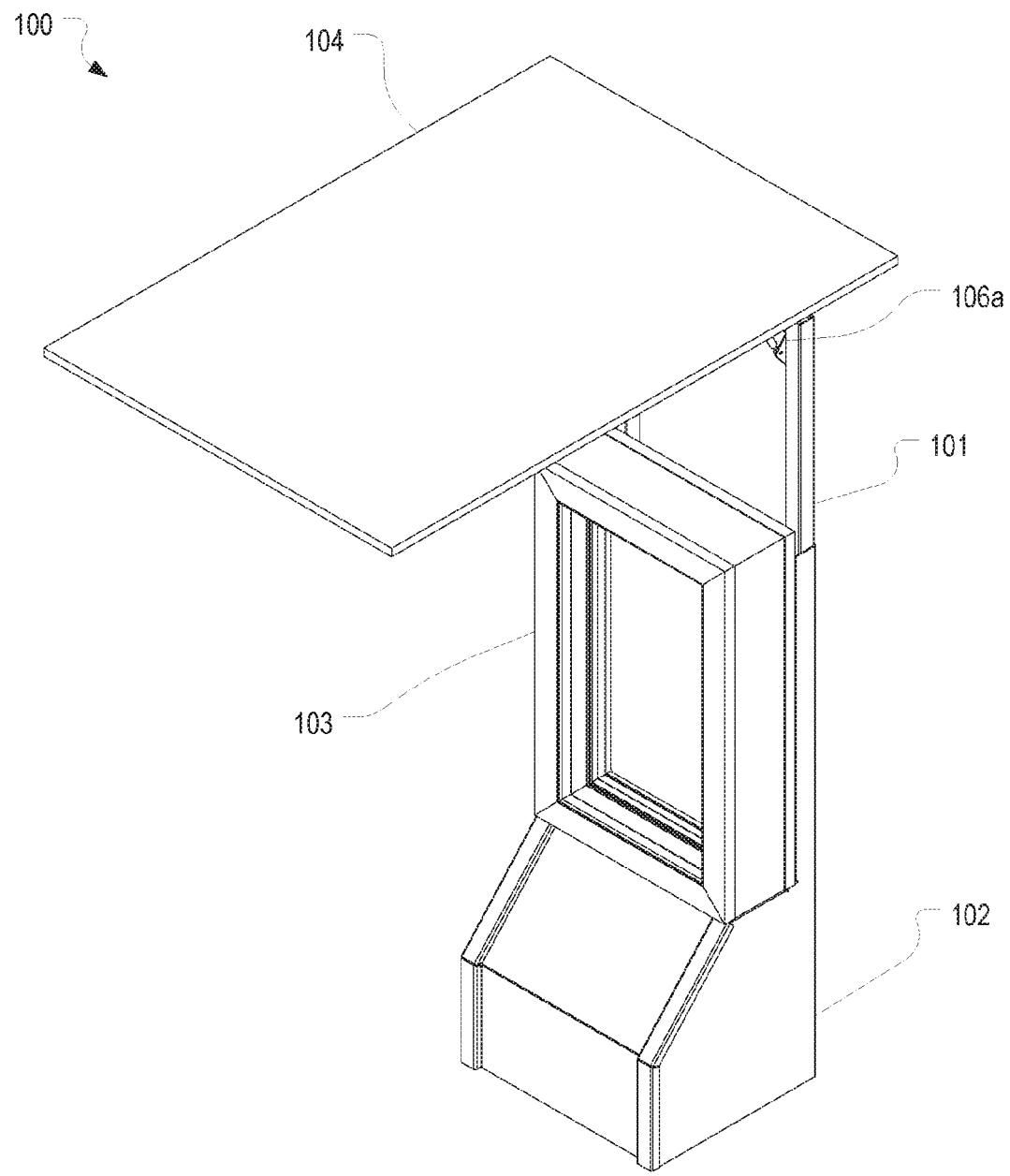
FIGS. 1A-1C illustrate a front perspective view, a side view, and a front view respectively of a mobile wireless order point and pick-up station when the retractable awning is extended.

FIGS. 1A-1C, 2A, and 2B illustrate various views of a mobile wireless order point and pick-up station 100 configured in accordance with one or more embodiments of the present invention. Station 100 includes a frame 101, a base 102, an enclosure 103 for a digital display device (e.g., a television), an awning 104, and a pallet jack 105 that is integrated into base 102. Base 102 can be secured to frame 101 such that, when base 102 is lifted by pallet jack 105, station 100 can be transported. Frame 101 can be configured to allow awning 104 to be retracted to facilitate transport and storage of station 100.

Figure 1B:
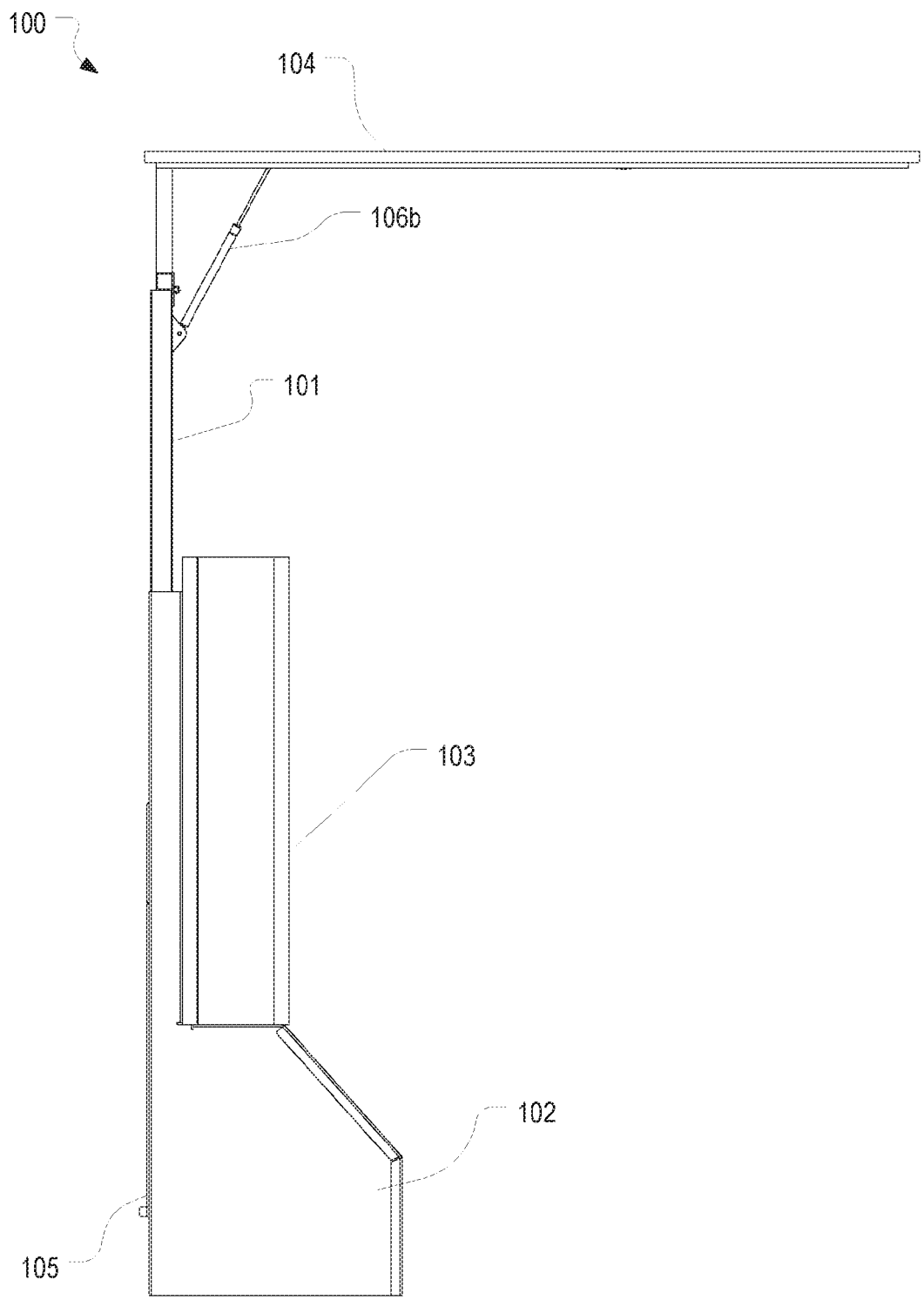
Figure 1C:
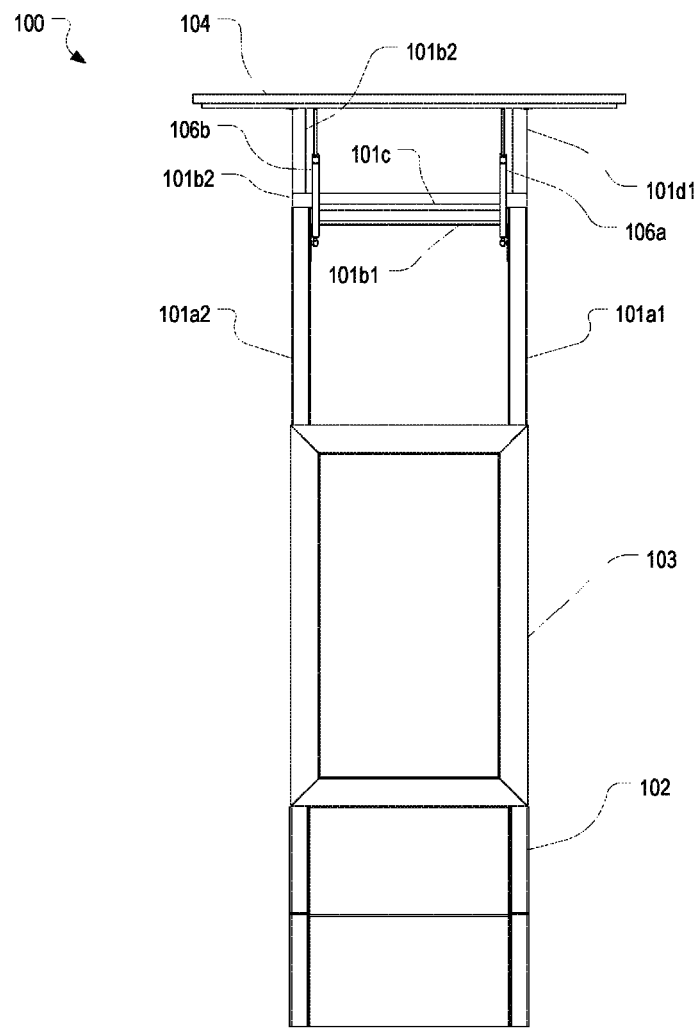

As best shown in FIG. 1C, station 100 can include one or more shocks 106a, 106b for maintaining awning 104 in the extended position shown in FIGS. 1A-1C. In particular, frame 101 can include two opposing vertical beams 101a1, 101a2 to which one end of shocks 106a, 106b are coupled. The opposing end of shocks 106a, 106b can be coupled to an underside of awning 104 such that, when the shocks are extended, they will provide an upward force for maintaining awning 104 in a generally horizontal position.

Figure 1D:
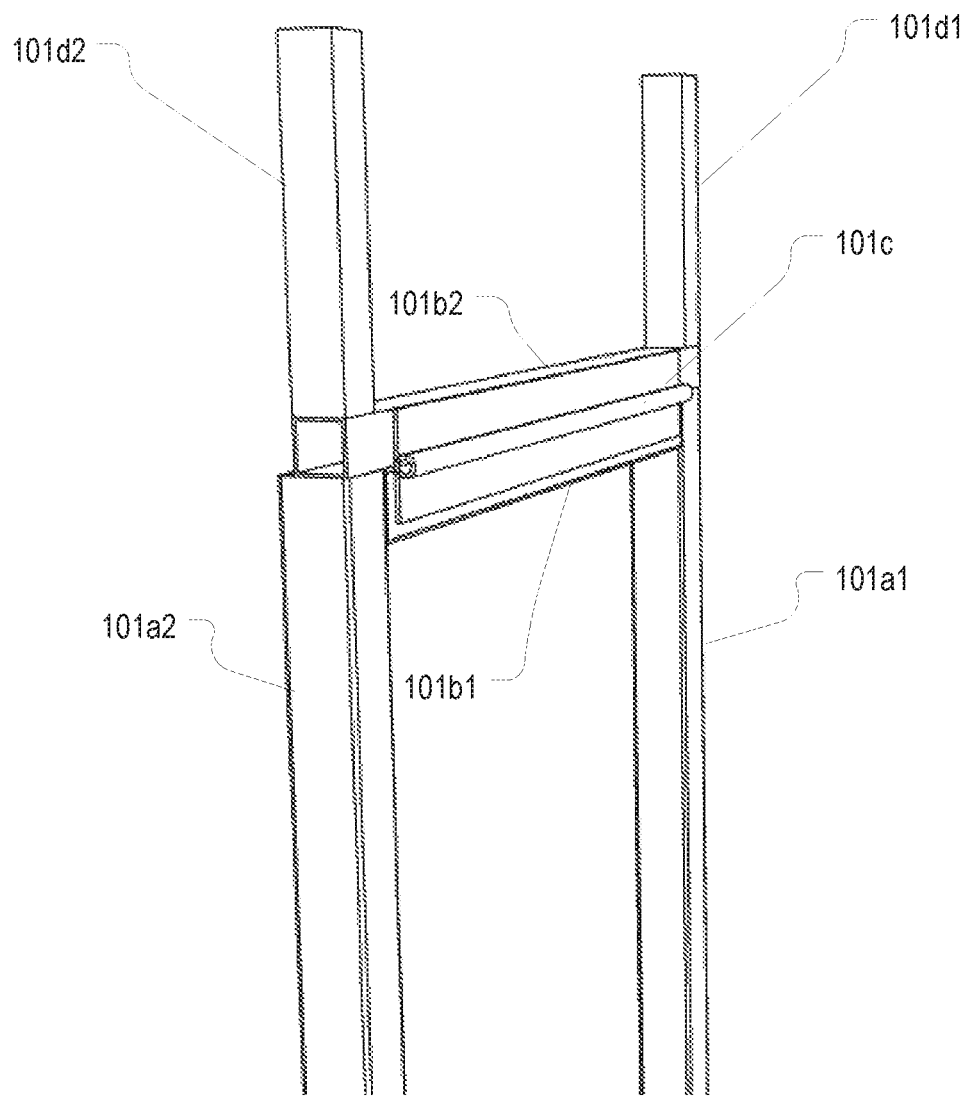
FIG. 1D illustrates an example of how the frame of the mobile wireless order point and pick-up station can be configured to allow the awning to retract.
Figure 2A:
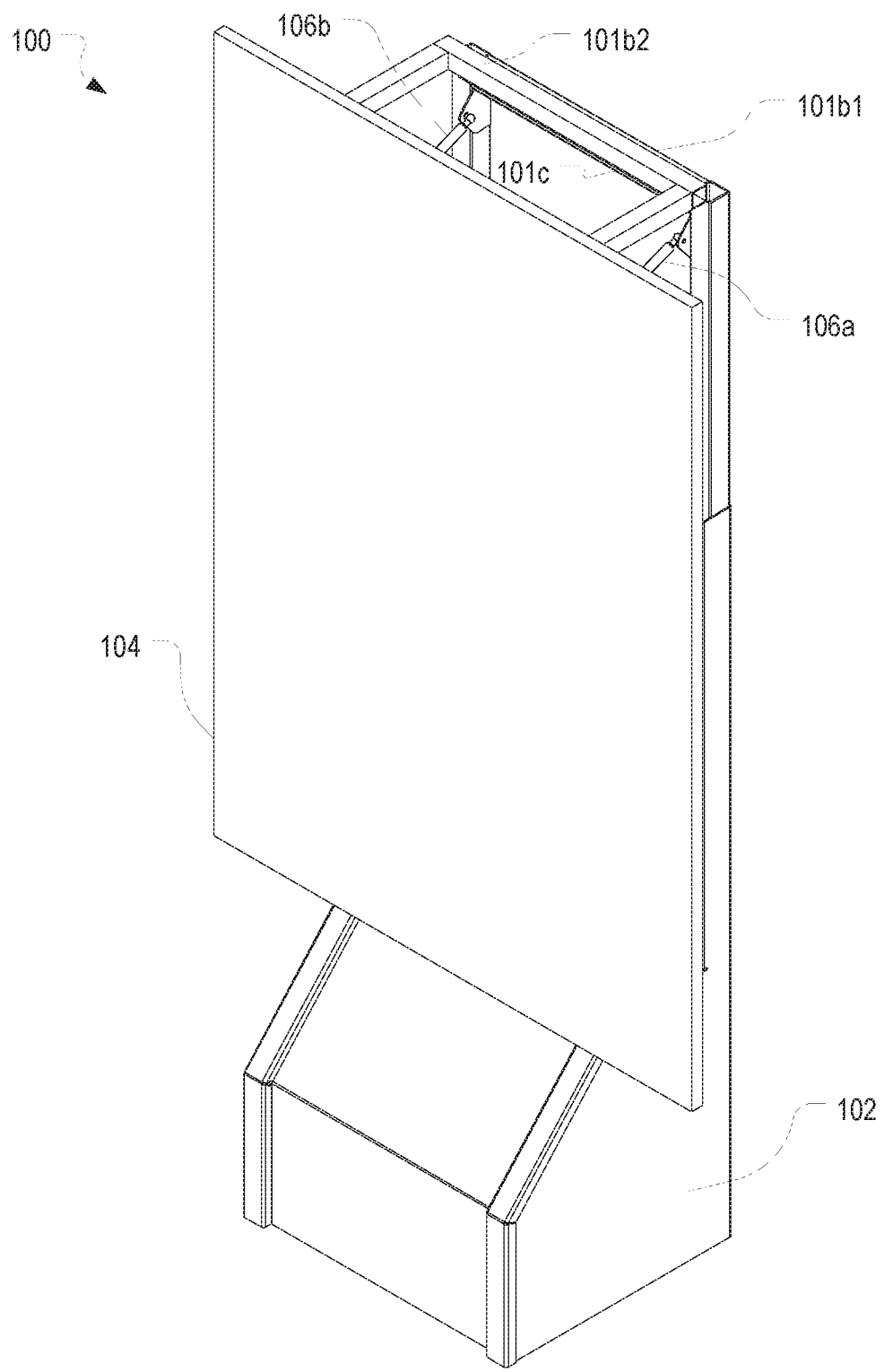
FIGS. 2A and 2B illustrate a front perspective view and a side view respectively of the mobile wireless order point and pick-up station with the awning retracted.
Figure 2B:
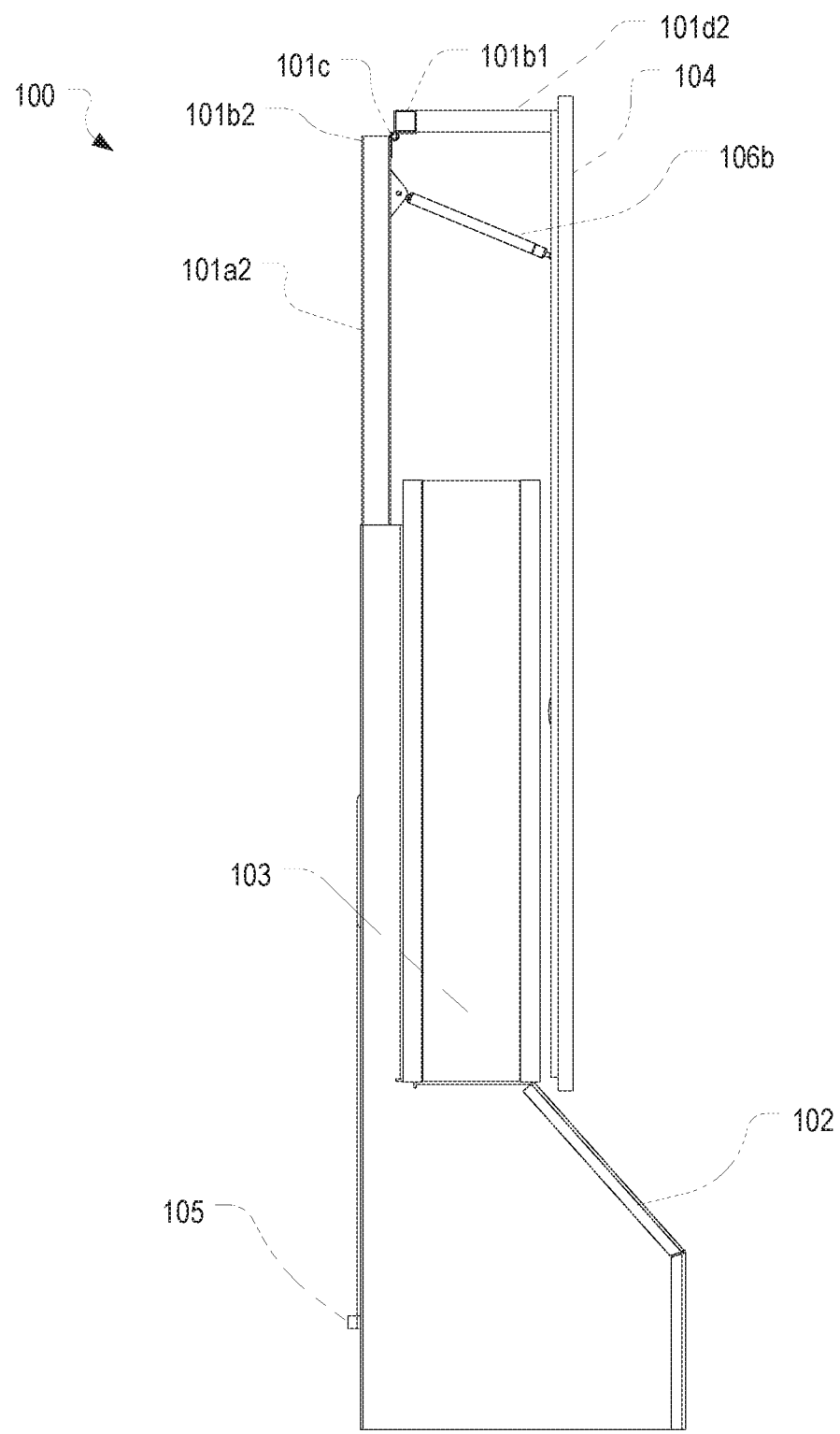

To allow awning 104 to pivot between the extended position shown in FIGS. 1A-1C and a retracted position shown in FIGS. 2A and 2B, frame 101 can include a hinged connection. As best shown in FIG. 1D, this hinged connection can be formed of a first horizontal beam 101b1 that extends between vertical beams 101a1, 101a2, a second horizontal beam 101b2 that extends between vertical beams 101d1 and 101d2, and a hinge 101c that is coupled between first and second horizontal beams 101b1, 101b2. Hinge 101c can be oriented to allow awning 104 to pivot downwardly overtop enclosure 103.

Vertical beams 101d1, 101d2 can function to position this hinged connection at a distance from awning 104 so that, when awning 104 is retracted, it will be oriented vertically and positioned immediately in front of enclosure 103. In particular, as shown in FIG. 2B, when awning 104 is in the retracted position, vertical beams 101d1, 101d2 will be in a generally horizontal position which allows awning 104 to be oriented vertically in front of and adjacent to enclosure 103. In this way, the retracted orientation forms a compact design to facilitate storage and transport of station 100. Further, by positioning awning 104 overtop enclosure 103, awning 104 can protect a display device contained within enclosure 103. As is also shown in FIG. 2B, a length of vertical beams 101a1, 101a2 as well as a length of awning 104 can be configured such that awning 104 will fully cover enclosure 103 when in the retracted position.

Base 102 can have a shape that forms a flat area on top of which enclosure 103 may sit. Enclosure 103 may be secured to base 102 and/or frame 101 to allow enclosure 103 to house a digital display device such as a television (not shown). Enclosure 103 may be configured to provide passive cooling to an enclosed digital display device to thereby allow station 100 to be used in outdoor environments where high temperatures may be experienced. As an example, enclosure 103 may form an airflow channel around an enclosed display device which can serve to carry heat away from the display device. Examples of suitable designs that can be employed for enclosure 103 are described in U.S. patent application Ser. No.14/715,265 which is incorporated herein by reference. However, simpler designs than those described in that application may be employed for enclosure 103 as will be addressed below.

Figure 3:
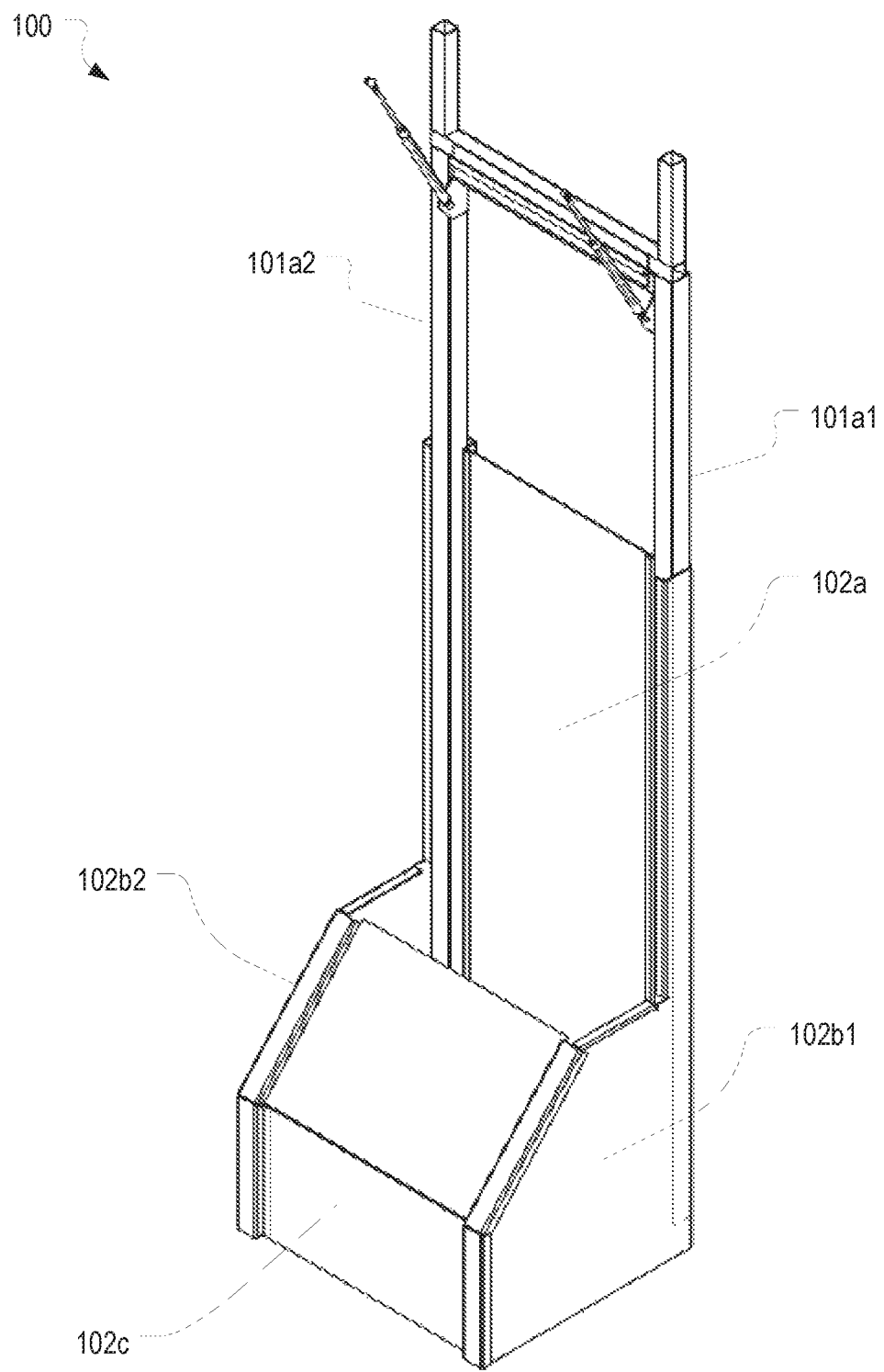
FIG. 3 illustrates the mobile wireless order point and pick-up station with the awning and display device enclosure removed.

FIG. 3 illustrates frame 101 and base 102 with enclosure 103 and awning 104 removed. As shown, base 102 can include a rear wall 102a which is coupled to and extends between vertical beams 101a1, 101a2. Opposing sidewalls 102b1, 102b2 of base 102 can extend forwardly from rear wall 102a and/or vertical beams 101a1, 101a2 thereby forming sidewalls of a cabinet. A top surface of sidewalls 102b1, 102b2 can form the surface on which enclosure 103 may be positioned in some embodiments. A front wall 102c of base 102 can extend between sidewalls 102b1, 102b2 at a front edge of sidewalls 102b1, 102b2. The combination of rear wall 102a, sidewalls 102b1, 102b2, front wall 102c, and a bottom 102d (shown in FIGS. 6A and 6B) form the cabinet in which various components can be stored as will be described below. In some embodiments, one or more of these walls can be removable to allow access to the components within the cabinet. For example, front wall 102c may be removably coupled to sidewalls 102b1, 102b2 (or otherwise configured to open).

Figure 4:
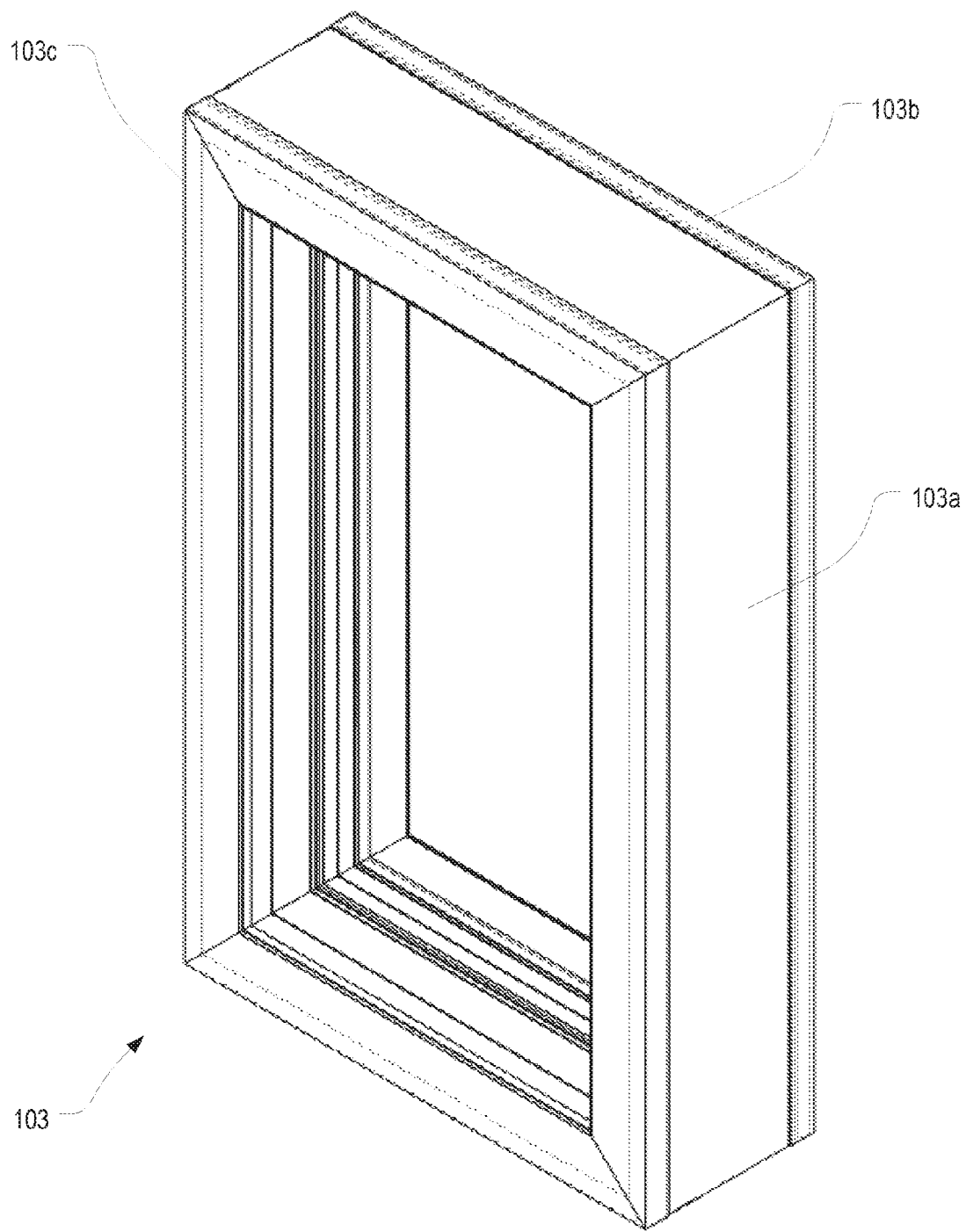
FIG. 4 illustrates the display device enclosure in isolation.

FIG. 4 illustrates an example of enclosure 103 in isolation. In some embodiments, enclosure 103 can comprise a main housing 103a, a rear panel 103b, and a front panel 103c. Main housing 103a can be sized and shaped to accommodate a display device such as a flat screen television or monitor. Although not shown, enclosure 103 and/or frame 101 may include a mount positioned within enclosure 103 to which the display device may be secured. Enclosure 103 can be coupled to frame 101 is any suitable way. In some embodiments, main housing 103a can form airflow channels through which air can flow for removing heat from around the display device. For examle, these airflow channels can be formed internally within main housing 103a (i.e., main housing 103a—or at least a portion of it—can be hollow). Although not shown, main housing 103a can include one or more openings or vents through which air may flow. For example, a bottom surface of main housing 103a can include one or more vents through which air may flow into one or more channels in main housing, while a top surface of main housing 103a can include one or more vents through which air may flow out of the one or more channels in main housing 103a.

Figure 5:
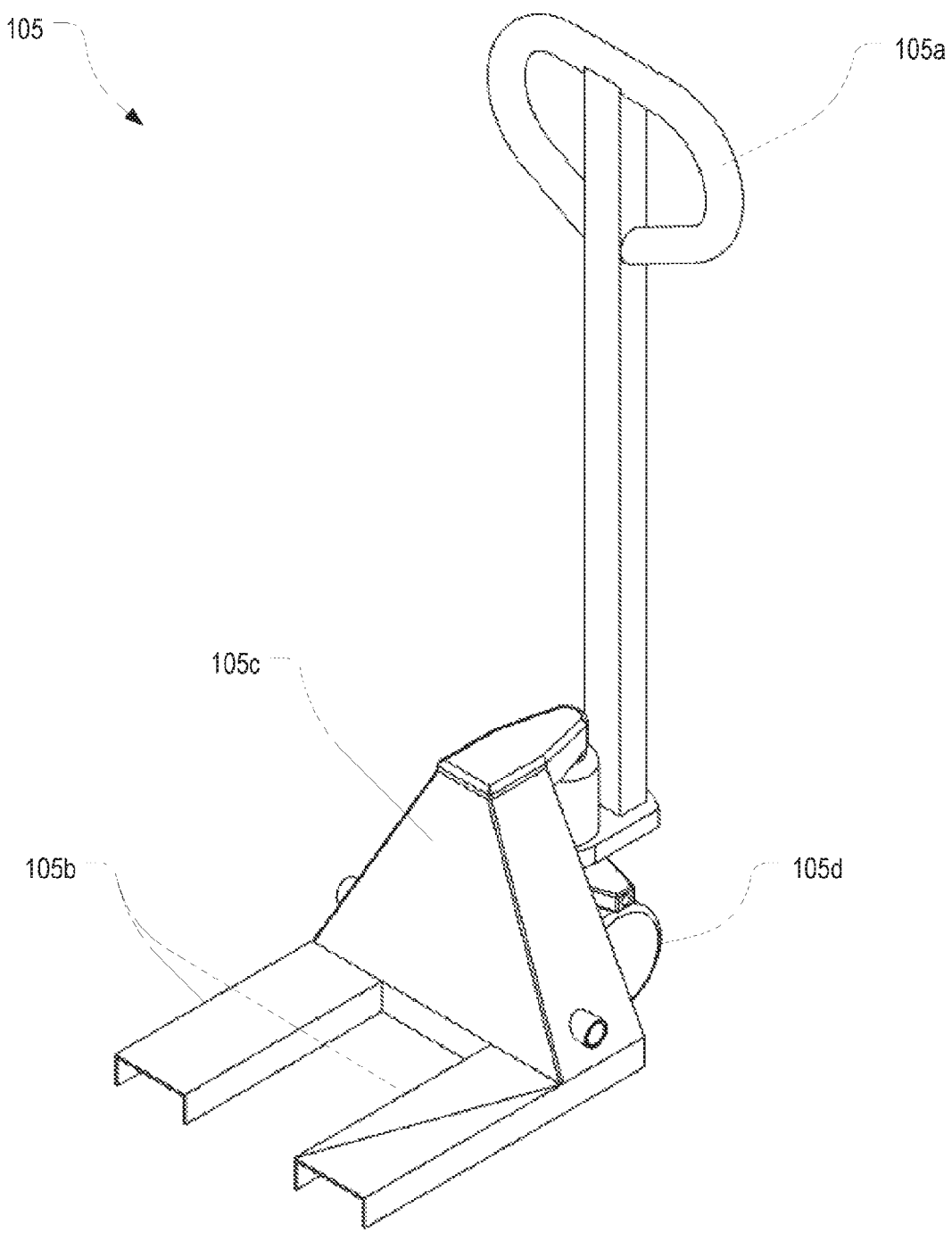
FIG. 5 illustrates the pallet jack in isolation.

FIG. 5 provides an example of pallet jack 105 in isolation. Pallet jack 105 can include a body 105c from which arms 10b5 extend. A wheel or wheels 105d may be positioned under body 105c. Body 105c and/or arms 105b can be configured to pivot upwardly with respect to wheels 105d thereby causing a lifting force to be applied to bottom 102d. This pivoting can be accomplished by rotating handle 105a in a downward direction as is common with pallet jacks.

Figure 6A:
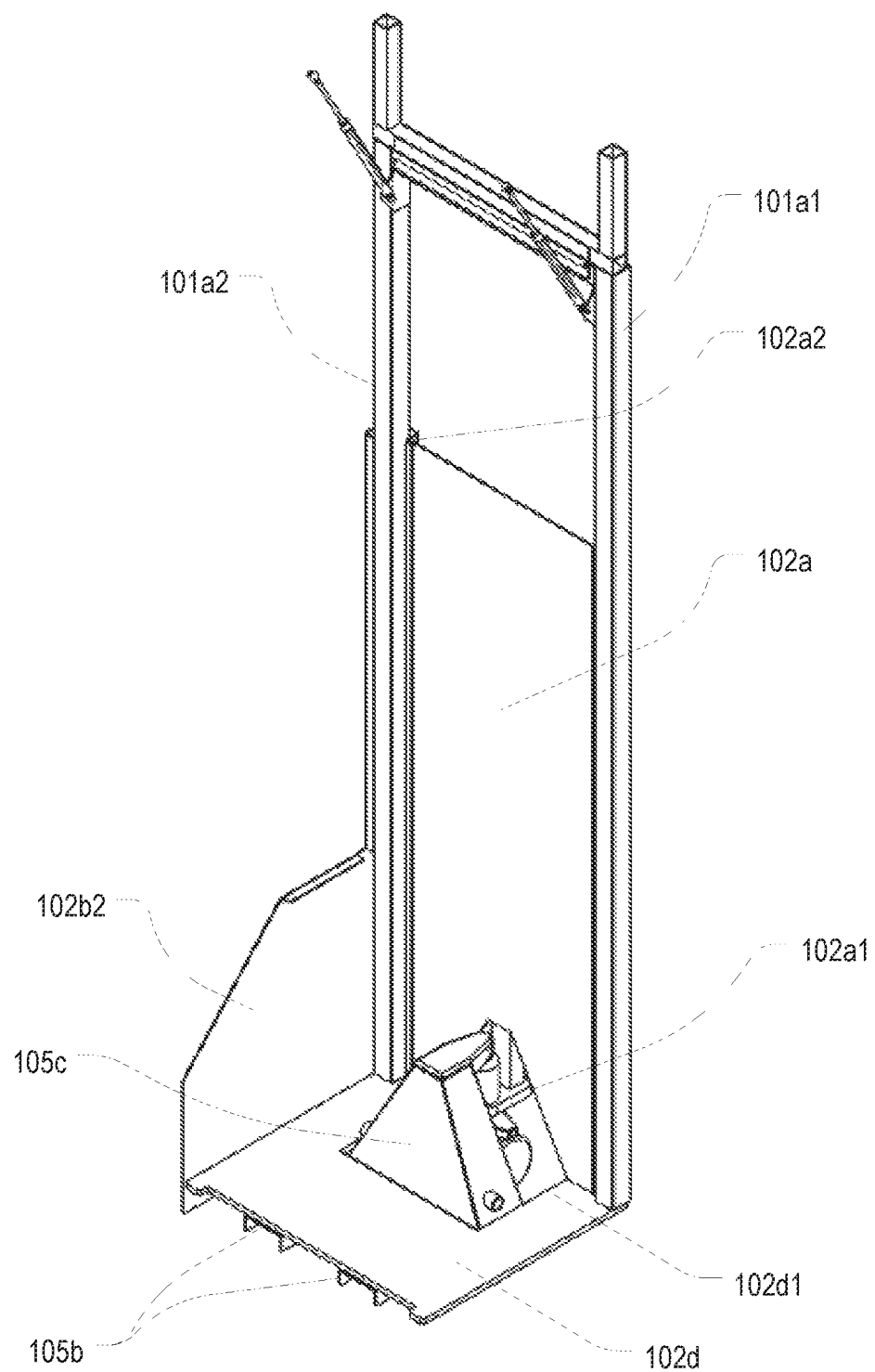
FIG. 6A illustrates how the pallet jack can be integrated into the mobile wireless order point and pick-up station.

FIG. 6A illustrates how pallet jack 105 can be integrated into base 102. As shown, rear wall 102a and bottom 102d can include cutouts 102a1, 102d1 respectively into which body 105c is inserted to thereby position arms 105h underneath bottom 102d. Rear wall 102a can be positioned with respect to vertical beams 101a1, 101a2 to form an offset 102a2. With pallet jack 105 secured underneath base 102, handle 105a can be located at least partially within this oflet 102a2 to minimize the amount of handle 105a that will protrude beyond the rear surface of vertical beams 101a1, 101a2. When station 100 is in use, handle 105a can be positioned vertically within offset 102a2 so that it will form little or no obstruction to the use of station 100 such as is shown in FIG. 1B. Then, when it is desired to move station 100, handle 105a can be rotated downwardly to cause arms 105b to elevate base 102 thereby allowing station 100 to be easily transported.

Figure 6B:
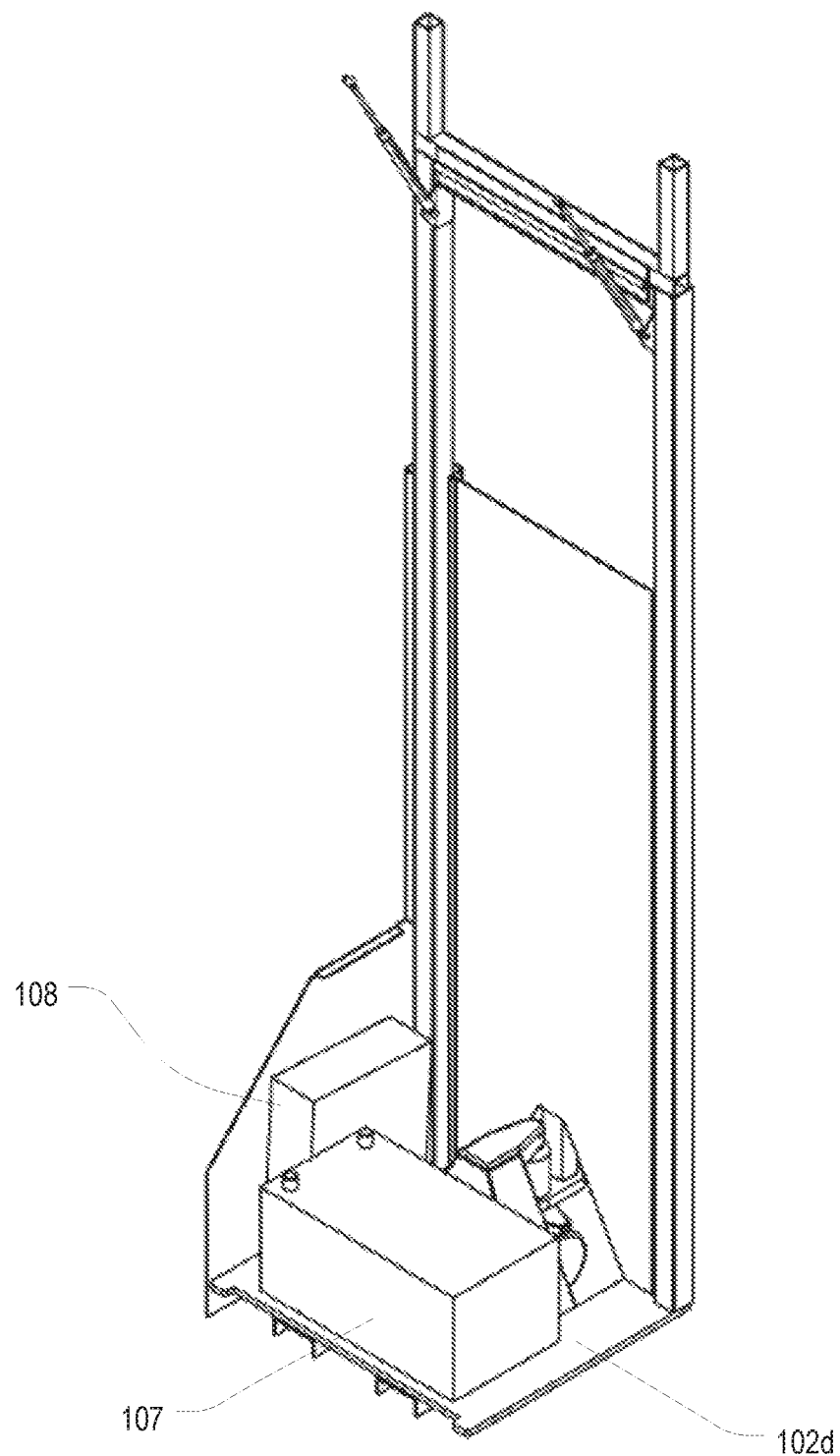
FIG. 6B illustrates how a battery and wireless circuitry can be integrated into the mobile wireless order point and pick-up station.

FIG. 6B illustrates how the cabinet formed by base 102 can house components for enabling station 100 to be portable/wireless. As shown, a rechargeable battery 107 and wireless circuitry 108 can be supported on bottom 102d and enclosed within base 102. A display device (which may be a touch display in some embodiments) that is positioned within enclosure 103 can be coupled to battery 107 and circuitry 108 to allow it to function as a wireless order point and/or pick-up station. As shown in FIG. 3, a top section of base 102 over which enclosure 103 may be positioned may be open (or include an opening) through which wires may run to connect the display device with battery 107 and circuitry 108. In some embodiments, enclosure 103 may also include an opening for such wires. Alternatively, enclosure 103 may be positioned to form a small gap between rear wall 102a and enclosure 103 through which the wires may be run, or rear wall 102a may include a suitable opening.

Figure 7A:
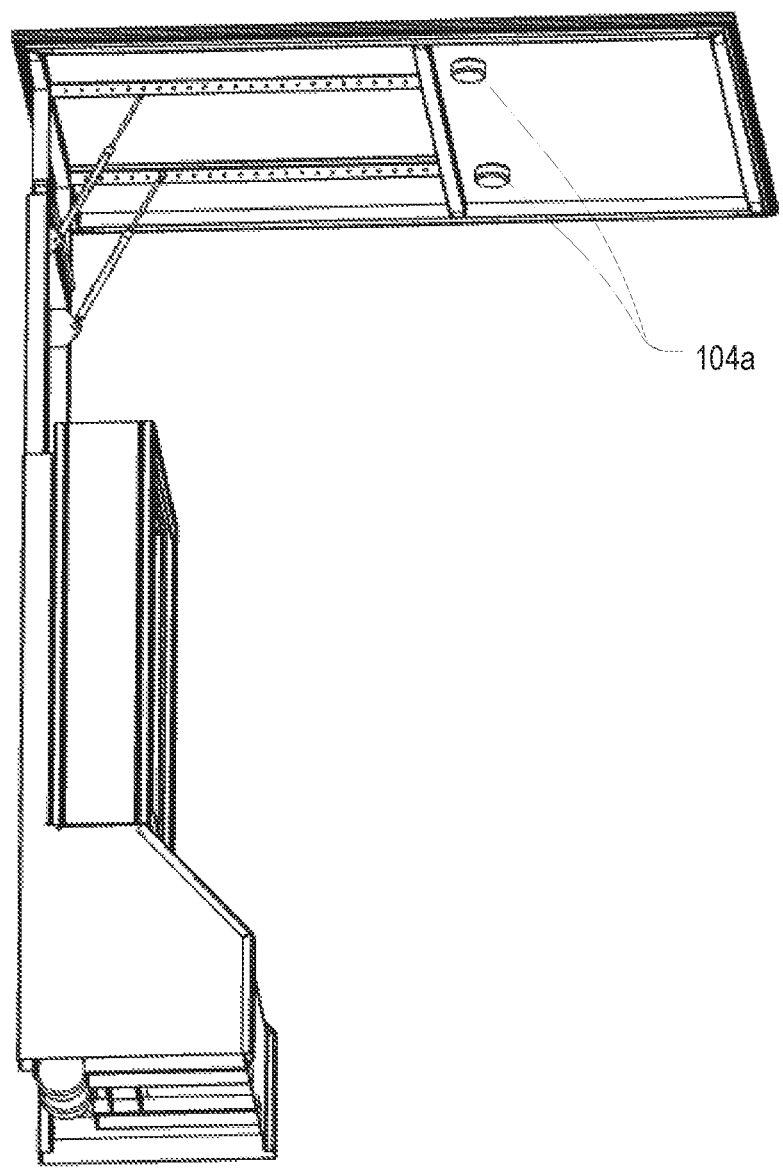
FIG. 7A a side perspective view of the mobile wireless order point and pick-up station in which the underside of the awning is visible.

FIG. 7A illustrates the underside of awning 104. As shown, awning 104 may include one or more lights 104a which may illuminate enclosure 103 and base 102. Lights 104a may facilitate use of station 100 at night or in dark settings. In some embodiments, lights 104a may be wired to battery 107, while in other embodiments, a separate power source (e.g., a battery in awning 104 or one or more solar cells on awning 104) may provide power for lights 104a. In some embodiments, awning 104 may be equipped with solar cells for charging battery 107.

Figure 7B:
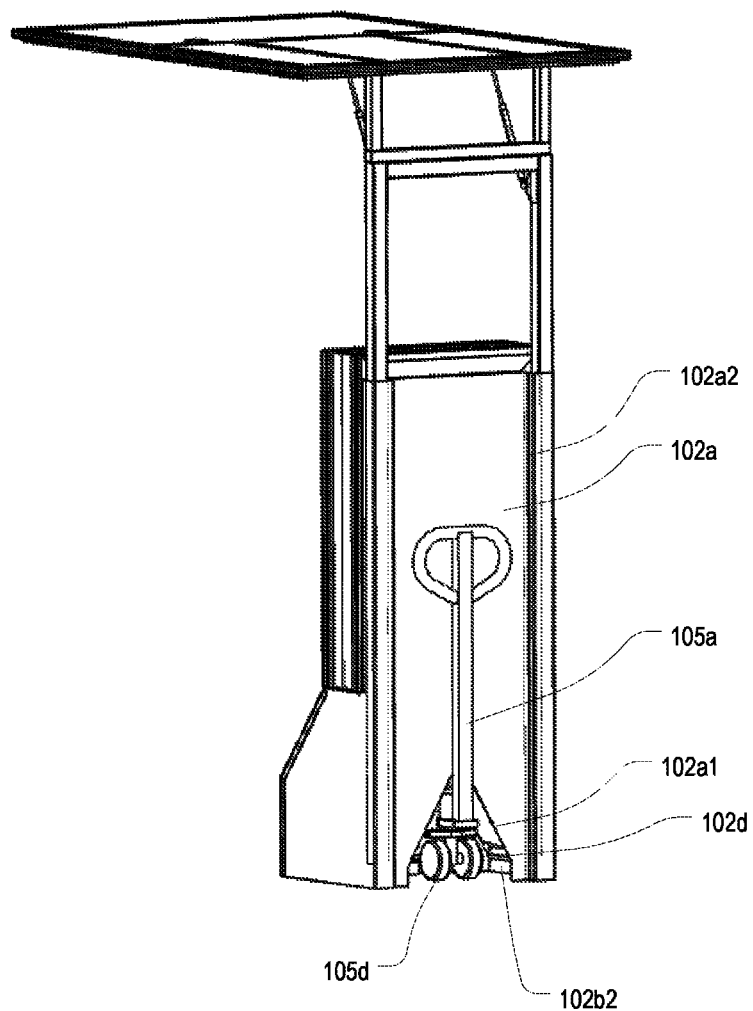
FIG. 7B is a rear perspective view of the mobile wireless order point and pick-up station showing how the pallet jack can be integrated into the mobile wireless order point and pick-up station.

FIG. 7B provides a rear view of station 100 to better illustrate how offset 102a2 can accommodate handle 105a. As shown, with pallet jack 105 coupled to base 102, wheel 105d will be at least partially inserted into cutout 102a1 to thereby allow handle 105a to be flush against rear wall 102a. Due to offset 102a2, at least a portion of handle 105a will be positioned directly between vertical arms 101a1, 101a2. FIG. 7B also illustrates how bottom 102d is positioned above a bottom surface of the other components of base 102 to thereby form a gap 102b2 between bottom 102d and the surface on which station 100 is placed. The height of gap 102b2 can be configured such that bottom 102d will rest on or slightly above arms 105b while the bottom surface of the other components of base 102 rest on the ground/floor. In this way, the weight of station 100 can be spread around base 102 to prevent placing undue stress on bottom 102d during normal operation of station 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mobile wireless order point and pick-up station comprising:
    a frame comprising a first set of opposing vertical beams;
    a base coupled to the first set of opposing vertical beams, the base forming a cabinet for housing a battery and wireless circuitry;
    an enclosure for a digital display device, the enclosure being secured to the frame above the base and the enclosure having an offset;
    an awning coupled to the frame and positioned overtop the enclosure; and
    a pallet jack integrated into the base and having a handle which may be positioned vertically within the enclosure offset.

2. The station of claim 1, wherein the awning is retractable.

3. The station of claim 2, wherein, when retracted, the awning is oriented vertically overtop the enclosure.

4. The station of claim 3, wherein the frame further comprises:
    a first horizontal beam that extends between the first set of opposing vertical beams;
    a second set of opposing vertical beams that are positioned above the first set of opposing vertical beams;
    a second horizontal beam that extends between the second set of opposing vertical beams; and
    a hinge that couples the second horizontal beam to the first horizontal beam.

5. The station of claim 4, wherein a length of the second set of opposing vertical beams is configured to position the awning in front of the enclosure when the awning is in the vertical orientation.

6. The station of claim 2, further comprising one or more shocks coupled between the frame and the awning.

7. The station of claim 1, wherein the base comprises a rear wall that is coupled between the first set of opposing vertical beams, the rear wall having a cutout through which the pallet jack extends.

8. The station of claim 7, wherein the base comprises a bottom that includes a cutout into which the pallet jack inserts, and wherein the pallet jack includes one or more arms that are positioned underneath the bottom.

9. The station of claim 7, wherein the base comprises opposing sidewalls having a shape forming a generally flat surface on which the enclosure is positioned.

10. The station of claim 9, wherein the base comprises a front wall that extends between the opposing sidewalls.

11. The station of claim 10, wherein the front wall is removable to provide access to the battery and wireless circuitry.

12. The station of claim 7, wherein the rear wall is frontwardly offset with respect to the first set of opposing vertical beams, and wherein a handle of the pallet jack is positioned within the offset.

13. The station of claim 1, wherein the enclosure provides passive cooling to the digital display device.

14. The station of claim 1, wherein the awning includes one or more lights.

15. The station of claim 1, wherein the enclosure is secured to the frame via the base.

16. A mobile wireless order point and pick-up station comprising: a frame; a base coupled to the frame, the base housing a battery and wireless circuitry; an enclosure for a digital display device, the enclosure being positioned above the base and being secured to one or both of the frame or the base, wherein said enclosure has air flow channels formed therein to remove heat from the digital display device; and an awning coupled to the frame via a hinged connection, the awning having an extended orientation in which the awning is oriented generally horizontally overtop the enclosure and a retraced orientation in which the awning is oriented generally vertically in front of the enclosure; and shocks attached to said awing at one end and said enclosure at the other end for maintaining said awning in the horizontal orientation; and further comprising a pallet jack integrated into the base and configured to transport the station.

17. The station of claim 16, wherein the hinged connection is formed by:
    a first horizontal beam that extends between a first pair of opposing vertical beams;
    a second horizontal beam that extends between a second pair of opposing vertical beams; and
    a hinge that is coupled between the first and second horizontal beams.

18. A mobile wireless order point and pick-up station comprising:
    a frame;

a base coupled to the frame;

an enclosure for a digital display device, the enclosure being positioned above the base and being secured to one or both of the frame or the base;

an awning coupled to the frame via a hinged connection; and a pallet jack integrated into the base.

19. The station of claim 18, wherein the awning pivots between an extended position in which the awning is oriented horizontally overtop the enclosure and a retracted position in which the awning is oriented vertically in front of the enclosure.

* * * * *